(12) United States Patent
Andrews et al.

(10) Patent No.: US 10,564,951 B2
(45) Date of Patent: Feb. 18, 2020

(54) MANAGED SOFTWARE AS A SERVICE DEPLOYMENT UTILIZING A CLIENT KEY TO GENERATE A ONE-TIME USE REFERENCE FOR DELIVERY

(71) Applicant: Dell Products L.P., Round Rock, TX (US)

(72) Inventors: Carlton A. Andrews, Austin, TX (US); Warren W. Robbins, Celina, TX (US)

(73) Assignee: Dell Products L.P., Round Rock, TX (US)

( * ) Notice: Subject to any disclaimer, the term of this patent is extended or adjusted under 35 U.S.C. 154(b) by 220 days.

(21) Appl. No.: 15/054,234

(22) Filed: Feb. 26, 2016

(65) Prior Publication Data

US 2017/0249132 A1 Aug. 31, 2017

(51) Int. Cl.
*G06F 21/00* (2013.01)
*H04L 29/06* (2006.01)
(Continued)

(52) U.S. Cl.
CPC .............. *G06F 8/60* (2013.01); *H04L 63/062* (2013.01); *H04L 67/146* (2013.01)

(58) Field of Classification Search
CPC ........ G06F 8/60; H04L 67/146; H04L 63/062
See application file for complete search history.

(56) References Cited

U.S. PATENT DOCUMENTS

| 2013/0238808 | A1* | 9/2013 | Hallem | H04L 63/0281 709/227 |
| 2016/0270020 | A1* | 9/2016 | Adrangi | G06F 17/30879 |
| 2016/0381030 | A1* | 12/2016 | Chillappa | H04L 63/102 726/11 |

FOREIGN PATENT DOCUMENTS

WO WO-2018208337 A1 * 11/2018 .......... G06F 9/5072

OTHER PUBLICATIONS

Zeinab Farahmandpour, Steve Versteeg, Jun Han, Anand Kameswaran; "Service virtualisation of internet-of-things devices: techniques and challenges"; May 2017; RCoSE '17: Proceedings of the 3rd International Workshop on Rapid Continuous Software Engineering; Publisher: IEEE Press; pp. 32-35 (Year: 2017).*

(Continued)

*Primary Examiner* — Kendall Dolly
*Assistant Examiner* — Courtney D Fields
(74) *Attorney, Agent, or Firm* — Terrile, Cannatti & Chambers; Stephen A. Terrile

(57) ABSTRACT

A system, method, and computer-readable medium for performing a secure userless device software deployment operation. The secure userless device software deployment operation enables a client information handing system and a server information handling system to independently and deterministically construct a host reference (such as a host universal resource locator (URL)). In certain embodiments, the host reference is used for the SaaS connection based on a fixed portion plus a unique portion created using a client's public key as an identifier. In certain embodiments, the secure userless device software deployment operation leverages a management system to broker a SaaS service deployment. In certain embodiments, the secure userless device software deployment operation securely attaches a managed userless device to a tenant based SaaS offering by leveraging a connection plug-in and temporary/ephemeral URL architecture with a one-time use construct.

18 Claims, 4 Drawing Sheets

(51) Int. Cl.
*G06F 8/60* (2018.01)
*H04L 29/08* (2006.01)
*G06F 9/50* (2006.01)
*H04W 72/04* (2009.01)

(56) References Cited

OTHER PUBLICATIONS

Wikipedia, OAuth, https://en.wikipedia.org/wiki/OAuth, printed Jun. 23, 2016.
Wikipedia, Bitly, https://en.wikipedia.org/wiki/Bitly, printed Jun. 23, 2016.

\* cited by examiner

MANAGED SOFTWARE AS A SERVICE DEPLOYMENT UTILIZING A CLIENT KEY TO GENERATE A ONE-TIME USE REFERENCE FOR DELIVERY

BACKGROUND OF THE INVENTION

Field of the Invention

The present invention relates to information handling systems. More specifically, embodiments of the invention relate to utilizing a client key to generate a one-time use reference for delivery of managed software to a userless and headless device.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to use a plurality of information handling system within information technology (IT) environments. With IT environments, it is often desirable to deploy assets such as software to the information handling systems via a Software as a Service (SaaS) operation. However, deploying software as a service to a userless and headless device can present security and manageability challenges that are not present in deployment scenarios to information handling systems which have users present with access to I/O devices such as keyboards and displays to manually authenticate and validate an installation. In an enterprise, domain join and domain based authentication secures the trust within the domain environment. In an environment where headless, userless devices are not attached to a domain and aren't assigned to user identities, securing the deployment of applications that are attached to specific and unique cloud services can be problematic.

For example, in certain environments it might be desirable to perform a post-install deployment of an agent (e.g., a Boomi atom agent such as a Statistica or FogLight agent available from Dell Inc.) on a device such as an Internet of Things (IoT) type gateway that has a trust relationship with a device management system such as a cloud client manager (CCM) management system and/or an AirWatch type management system. The management system can perform the deployment of the agent; however, linking the agent back to a tenant account for the SaaS service can require the gateway to deliver tenant specific information such as login, password or device identity information to the service. Having this tenant specific information sent programmatically to a login portal without user verification or an established certificate based trust relationship may not be secure. Accordingly, it would be desirable to provide a secure method for managed deployment of SaaS on-device agentry and account association.

SUMMARY OF THE INVENTION

A system, method, and computer-readable medium are disclosed for performing a secure userless device software deployment operation. The secure userless device software deployment operation enables a client information handing system and a server information handling system to independently and deterministically construct a host reference (such as a host universal resource locator (URL)). In certain embodiments, the host reference is used for the SaaS connection based on a fixed portion plus a unique portion created using a client's public key as an identifier. In certain embodiments, the secure userless device software deployment operation leverages a management system to broker a SaaS service deployment. In certain embodiments, the secure userless device software deployment operation securely attaches a managed userless device to a tenant based SaaS offering by leveraging a connection plug-in and temporary/ephemeral URL architecture with a one-time use construct.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
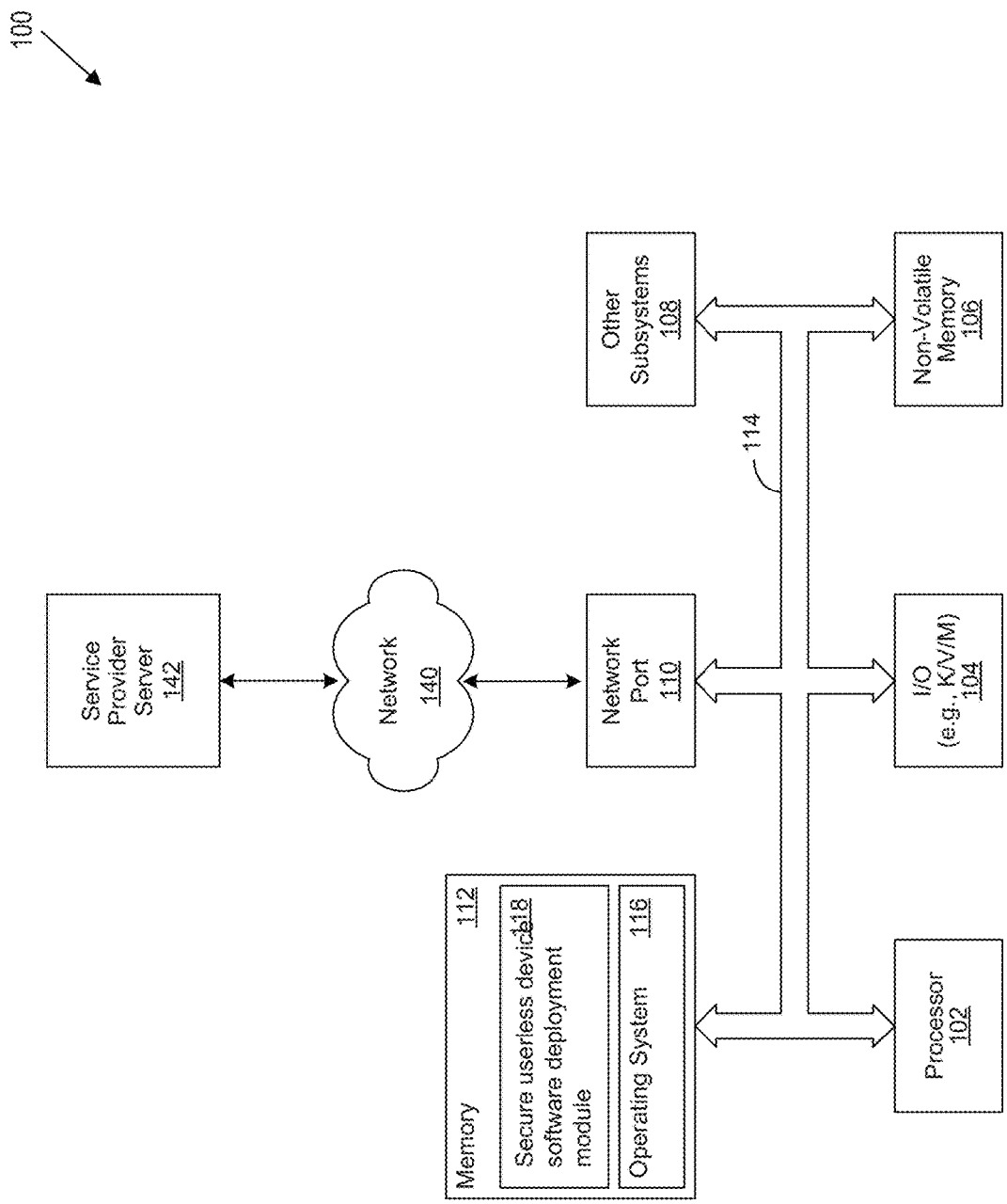
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise secure userless device software deployment module 118.

Figure 2:
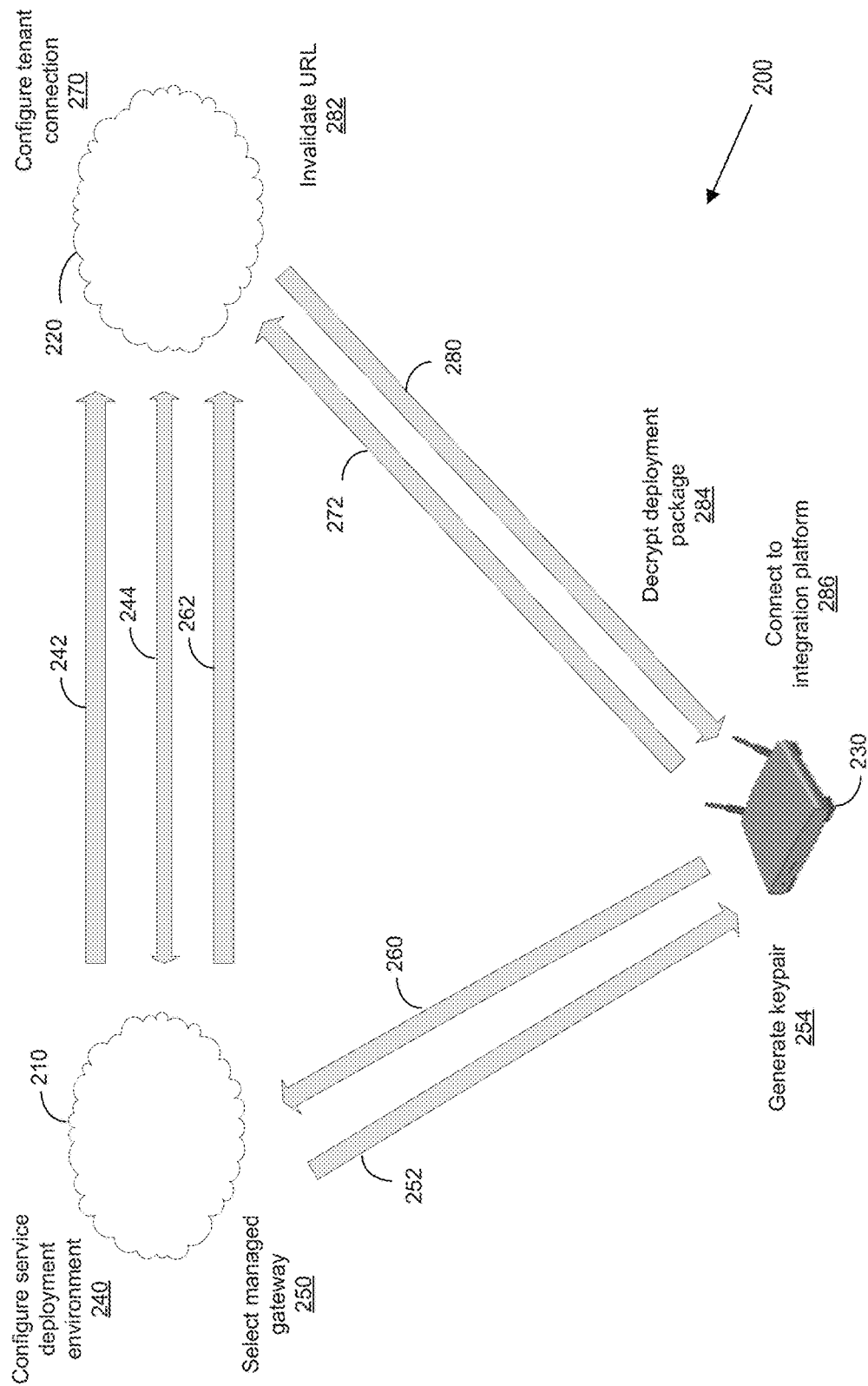
FIG. 2 shows a managed software as a service deployment environment.

The userless device software deployment module 118 performs a secure userless device software deployment operation. The secure userless device software deployment operation enables a client information handing system and a server information handling system to independently and deterministically (i.e., when given a particular input the device 230 will always produce the same output) construct a host reference (such as a host universal resource locator (URL)). In certain embodiments, the host reference is used for the SaaS connection based on a fixed portion plus a unique portion created using a client's public key as an identifier. In certain embodiments, the secure userless device software deployment operation leverages a management system to broker a SaaS service deployment. In certain embodiments, the secure userless device software deployment operation securely attaches a managed userless device to a tenant based SaaS offering by leveraging a connection plug-in and temporary/ephemeral URL architecture with a one-time use construct. For the purposes of this disclosure a userless device may defined as a autonomous device which functions without any user interaction. Thus a userless device has no human personal identity and user interaction directly assigned to the device. A standard computer system for instance, has a user who will log in with a personal identity and direct operations on the computer system. A userless device functions autonomously without a user in front of it. Additionally, for the purposes of this disclosure a headless device may be defined as a device which has no associated I/O devices including but not limited to a keyboard, pointing device such as a mouse and display device) via which a user may directly view applications or operations of the device. Accordingly, a userless headless device is an autonomous device having no associated I/O device. Referring to FIG. 2, a managed software as a service deployment environment 200 is shown. More specifically, the service deployment environment 200 includes a device management framework 210, an integration platform 220 and at least one client device 230. In certain embodiments, the device management framework 210 comprises a client manager such as the Dell Cloud Client Manager available from Dell Inc. and/or the AirWatch client management system available from EMC Inc. In certain embodiments, the integration platform 220 comprises a platform for providing a SaaS application or service. In certain embodiments, the integration platform 220 comprises an on-demand multi-tenant cloud integration platform for connecting cloud and on-premises applications and data such as the Boomi integration platform available from Dell Inc. In certain embodiments, the client device 230 includes at least one managed headless and userless device. In certain embodiments, the headless and userless device comprises an IoT gateway such as the Dell IoT gateway available from Dell Inc.

When performing a secure userless software deployment operation, the service deployment environment 200 is initially configured in an initial state at step 240. When configured in the initial state, there are one or multiple gateways deployed which are managed by the device management framework 210. Additionally, when in the initial state, there is also a tenant account created on the integration platform. This tenant account is known to the manager of the gateways (e.g., the device manage framework 210). Additionally, the manager of the gateways knows that the tenant account is to be attached to the gateways.

Next, at step 242, the manager from the device management framework logs into the integration platform 220 and attaches a device management framework tenant (e.g., a CCM tenant) (or subgroup) to a tenant of the integration platform 220 to be attached to one or more gateways. For the purposes of this disclosure a device management framework tenant may be defined as a user or group of users who share a common access with specific privileges to a particular instance of the device management framework. Next, at step 244, the device management framework 210 and the integration platform 220 exchange secrets and hold that trust for future transactions. In certain embodiments, the exchanged "secrets" correspond to cryptographic keys such as those exchanged via a Deffie-Hellman key exchange.

Next at step 250, a cloud manager within device management framework 210 selects a managed gateway (or a group of gateways for a repeated process) on which to perform the userless software deployment operation. Next, at step 252, the device management framework sends the client device 230 (e.g., the gateway) a connection plug-in (if there are specific needs for the SaaS service to be attached) and a partial URL to be used to build the target client-to-SaaS attach URL in a future connection. In certain embodiments, the partial URL may comprise a URL such as www.boomi.com\enrollgateway. Next at step 254, the client device 230 generates a public/private keypair via e.g., the connection plug-in. In certain embodiments, generation of the public/private keypair is coded as part of the connection plug-in delivered in step 252 as the plug-in describes the use of a partial URL to be part of the generation of the full URL based on both the partial URL and the public/private keypair.

Next, at step 260 the client device 230 provides the device management framework 210 the public key from the generated public/private keypair. In certain embodiments, the client device 230 also provides the device management framework 210 with metadata that describes the client to be attached. In certain embodiments, since the device 230 is sending the keypair to the management framework 210 to be relayed onto the integration platform 220, the device 230 can also send any other information that might be relevant to the operation. The management framework 210 typically knows everything about the device 230 that is needed by the integration platform. However in certain embodiments, the device 230 may include certain information that is not is not tracked by the management framework 210 but would be interesting to the integration platform 220. Examples of this type of information can include specifics about a version of software executing on the device, a version identifier of the device itself, a current location of the device, and/or an IP address of the device. Next, at step 262, the device management framework 210 forwards a request to the integration platform 220 to attach the client and provides the integration platform 220 the client generated public key. In certain embodiments, the device management framework 210 also provides the integration platform 220 with any metadata applicable to the specific client device 230. In certain embodiments, the request includes a request for a SaaS service from the integration platform 220.

Next, at step 270, the integration platform 220 configures a tenant connection to be ready to accept the client device. In certain embodiments, the tenant connection is via a SaaS service. In certain embodiments, when configuring the tenant connection, the integration platform 220 creates internal data, relationships and/or handles relating to the client device. In certain embodiments, the internal data, relationships and/or handles include any client identity to service relationship for the client device. In certain embodiments, then configuring the tenant connection a deployment package is created. In certain embodiments, the deployment package includes a client agent for deployment to the client device. In certain embodiments, the deployment package is encrypted using the public key of the client device 230. In certain embodiments, a one-time URL based on the predetermined partial URL (such as www.boomi.com\enrollgateway) and a hash (or other deterministic method derived from the client public key) is created and made active. In certain embodiments, the URL is of a combined form such as www.boomi.com\enrollgateway\<publickey based string generated by deterministic method>.

Next at step 272, the client device 230 also generates the same URL target based on the hash or other deterministic method derived from the client key of which the client device has knowledge. During step 272 the client device 230 also polls for that URL to become active such as by polling the deterministic URL made using the fixed portion of the deterministic URL in addition to a hash of the public key.

Next at step 280, with the URL active the client device 230 is coupled to the integration platform 220 and the integration platform downloads the encrypted deployment package to the client device. Next at step 282, after client device 230 has connected to the integration platform 220 and the integration platform 220 has downloaded the encrypted deployment package to the client device 230, the integration platform 220 removes and/or invalidates the URL. Next, at step 284, the client device decrypts the deployment package using the private key generated at step 254. Because the package is encrypted, any bad actor attempting to intercept the deployment package would find the information useless. Next at step 286, the client device 230 uses the deployment package to connect to the integration platform 220. In certain embodiments, the client device 230 uses the deployment package to join a SaaS through SaaS defined standard methods. Thus, the secure userless software deployment operation enables the client device to establish a trusted relationship with a service account tenant.

Figure 3A:
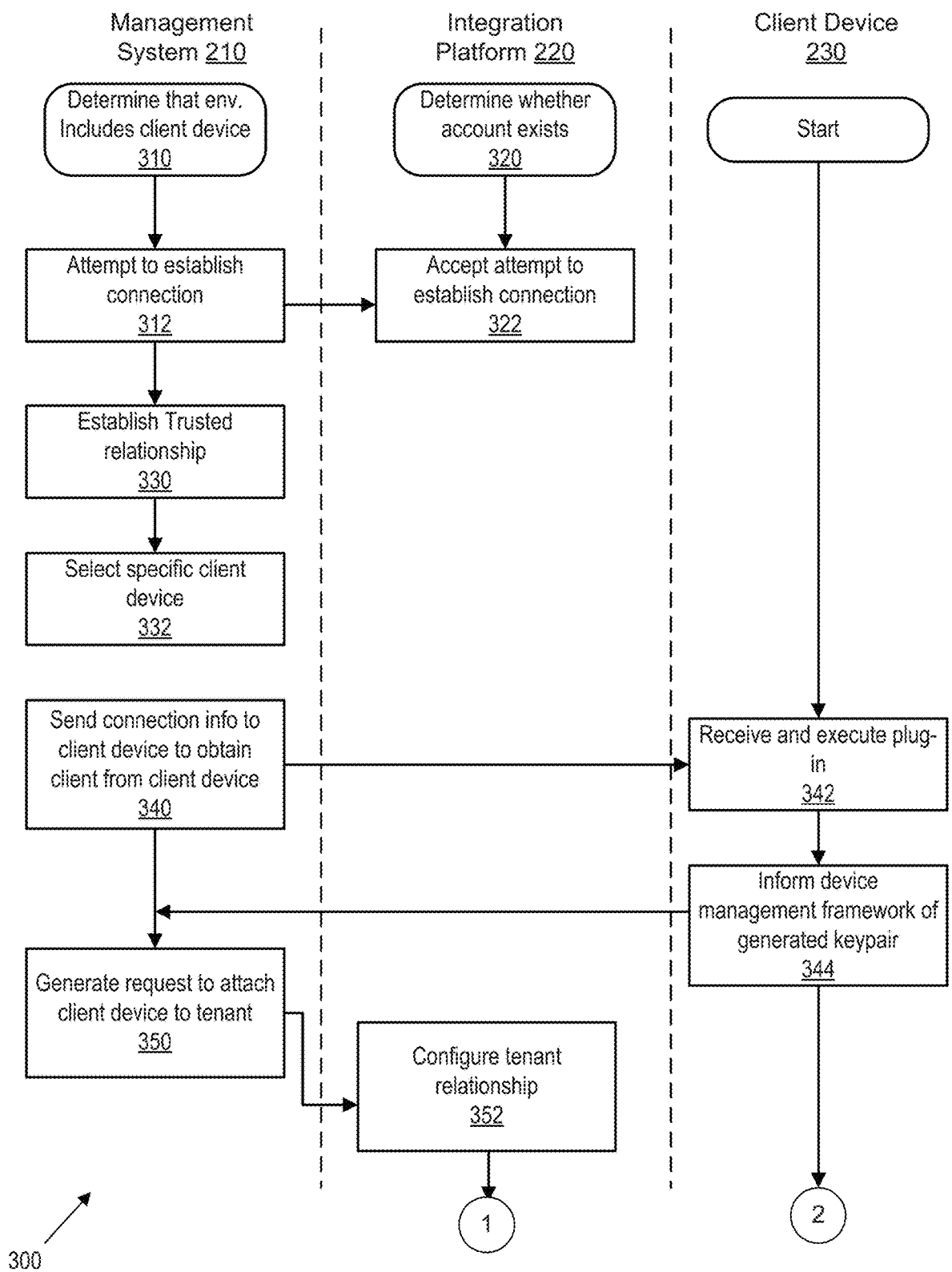
FIGS. 3A and 3B show a flow chart for performing a secure userless device software deployment operation.
Figure 3B:
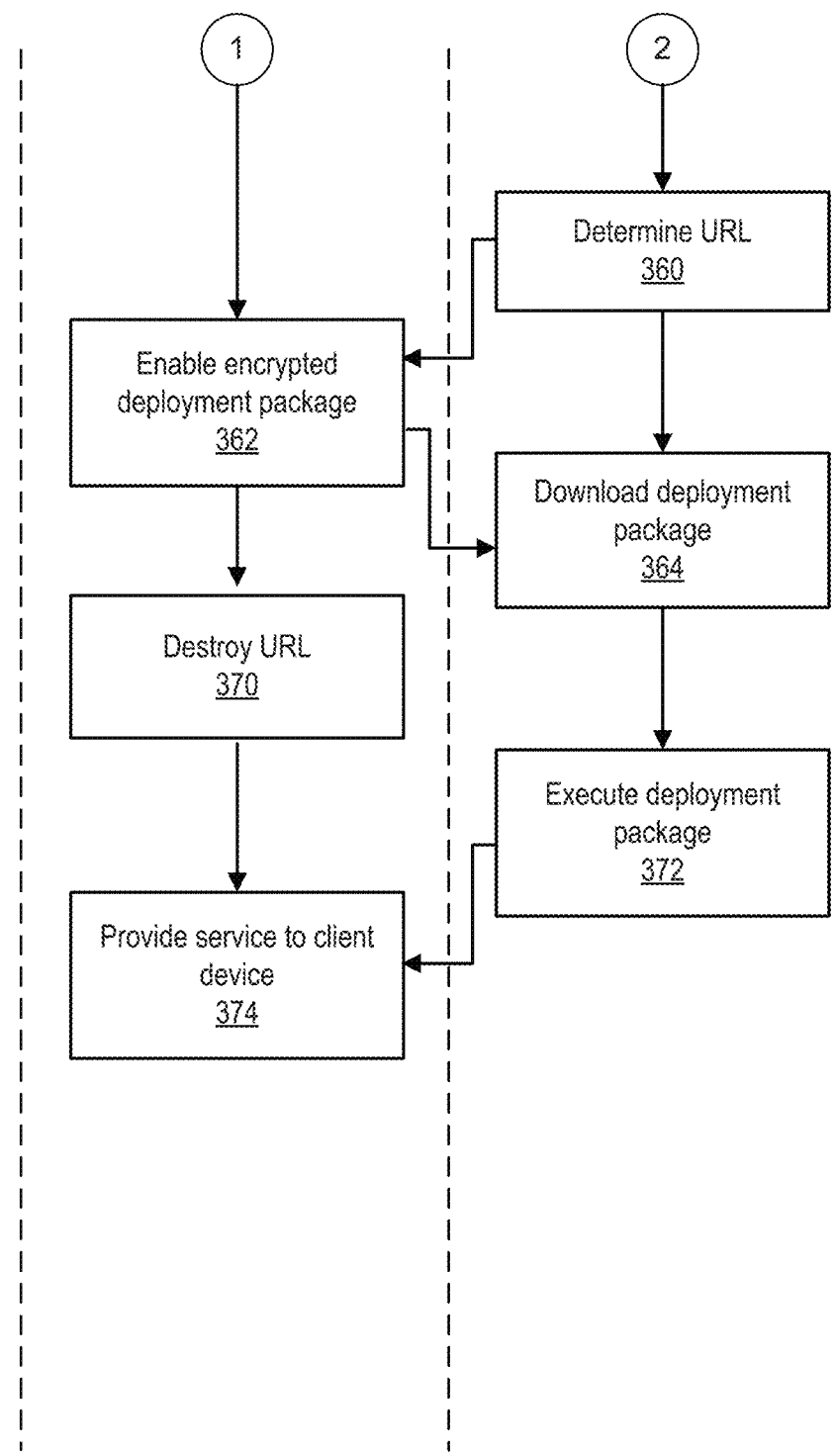

Referring to FIG. 3, a flow chart of a secure userless device software deployment operation 300 is shown. The flow chart shows the secure userless device software deployment operation 300 steps associated with the device management framework 210 (e.g., a management system such as a CCM), the integration platform 220 (e.g., a SaaS service such as the Boomi SaaS service available from Dell Inc.) and at least one client device 230 (e.g., an IoT gateway) of the service deployment environment 200. More specifically, the device management framework 210 begins the operation 300 at step 310 by determining that the environment 200 includes a client device 230 under management of the device management framework 210. In certain embodiments, the client device 230 is under management of a CCM. In certain embodiments, the client device 230 is under management of another framework. Next at step 312 the device management framework 210 attempts to establish a connection with the integration platform 220.

The integration platform 220 begins the operation 300 at step 320 by determining that the integration platform 220 has an account that is already in existence for the same entity that is managing the client device 230. Next, at step 322 the integration platform 220 accepts the attempt to establish a connection of step 312 and generates secrets and/or tokens to persist secure communications with the device management framework 210.

Next at step 330, the device management framework 210 and the integration platform 220 establish a trusted relationship for a selected tenant account. Next at step 332, the device management framework 210 selects a specific client device 230 (e.g., a specific gateway) for deployment.

Next at step 340, the device management framework 210 sends a connection plug-in, provisioning and policy for negotiation to obtain a SaaS client to the client device 230. In certain embodiments, the provisioning includes a fixed partial URL. Next, at step 342, the client device receives and executes the plug-in, the execution of which causes the client device to generate a keypair. Next at step 344 the client device plug-in informs the device management framework 210 that the keypair has been generated. The client device 230 then proceeds to provide the public key portion of the keypair to the device management framework 210. In certain embodiments, the client device also provides identifying metadata to the device management framework 210.

Next at step 350, the device management framework 210 generates a request to attach the client device 230 to a tenant. When generating this request, the device management framework 210 provides the public key generated by the client device to the integration platform 220. Next at step 352, the integration platform 220 configures a tenant relationship for the client device. When configuring the tenant relationship, the integration platform 220 creates a deployment package for the client device. In certain embodiments, when configuring the tenant relationship, the integration platform 220 encrypts the deployment package 220 using the public key provided by the client device 230. In certain embodiments, when configuring the tenant relationship, the integration platform generates a one-time use URL based on the public key provided by the client device.

Next, at step 360, the client device 230 determines the URL to poll based on the key provided to the management system by the client device 230 and proceeds to connect to the integration platform via the determined URL. In certain embodiments, the URL is determined by using the partial URL (e.g., www.boomi.com\enrollgateway) that was delivered in step 342 and combining the partial URL with the public key generated by the device 230. Next, at step 362, when the client device 230 connects to the integration platform 220 via the URL, the integration platform 220 enables the encrypted deployment package to be provided to the client device 230. Next at step 364, the client device 230 downloads the encrypted deployment package and decrypts the encrypted deployment package using the private key of the keypair.

Next, at step 370, after the encrypted deployment package is downloaded to the user device 230, the integration platform 220 destroys the URL. Next, at step 372, the client device executes the deployment package which causes the client device 230 to join the service provided by the integration platform 220. Next at step 374, the integration platform provides the service to the client device.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. The computer program code can also include programming languages which provide web service functionality such as AngularJS, PHP and Python. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for software deployment to a userless client device, comprising:
   sending the userless client device a connection plug-in from a device management framework, the connection plug-in describing use of a partial universal resource locator (URL) to be part of generation of a full URL based on the partial URL and a keypair;
   generating the keypair at the userless client device by executing the connection plug-in;
   providing the keypair to the device management framework, the keypair comprising a public key and a private key;
   generating a request to provide a client attachment to an integration platform, the request providing the public key to the integration platform;
   providing a host reference to the userless client device from the integration platform; and,
   establishing a relationship between the userless client device and the integration platform via the host reference; and wherein
   the userless client device comprises a headless device, the headless device comprising an Internet of Things (IoT) gateway, the IoT type gateway having a trust relationship with the device management framework, the device management framework comprising a cloud client manager, the headless device being an autonomous device having no associated input/output (I/O) device, the headless device not being attached to a domain and not being assigned a user identity.

2. The method of claim 1, wherein:
   the host reference comprises a universal resource locator (URL).

3. The method of claim 1, wherein:
   the integration platform independently and deterministically constructs the host reference.

4. The method of claim 1, wherein:
the host reference is used for a Software as a Service (SaaS) connection based on a fixed portion plus a unique portion created using the public key as an identifier.

5. The method of claim 1, further comprising:
leveraging a management system of the device management framework to broker a SaaS service deployment between the integration platform and the userless client device.

6. The method of claim 1, further comprising:
securely attaching a managed userless device to a tenant based SaaS offering by leveraging a connection plug-in and temporary/ephemeral URL architecture with a one-time use construct.

7. A system comprising:
a processor configured to execute instructions;
a data bus coupled to the processor and configured to provide instructions to the processor; and
a non-transitory, computer-readable storage medium embodying computer program code, the non-transitory, computer-readable storage medium being coupled to the data bus, the computer program code interacting with a plurality of computer operations and comprising instructions executed by the processor and configured for:
sending the userless client device a connection plug-in from a device management framework, the connection plug-in describing use of a partial universal resource locator (URL) to be part of generation of a full URL based on the partial URL and a keypair;
generating the keypair at the userless client device by executing the connection plug-in;
providing the keypair to the device management framework, the keypair comprising a public key and a private key;
generating a request to provide a client attachment to an integration platform, the request providing the public key to the integration platform; providing a host reference to the userless client device from the integration platform; and,
establishing a relationship between the userless client device and the integration platform via the host reference; and wherein
the userless client device comprises a headless device, the headless device comprising an Internet of Things (IoT) gateway, the IoT type gateway having a trust relationship with the device management framework, the device management framework comprising a cloud client manager, the headless device being an autonomous device having no associated input/output (I/O) device, the headless device not being attached to a domain and not being assigned a user identity.

8. The system of claim 7, wherein:
the host reference comprises a universal resource locator (URL).

9. The system of claim 7, wherein:
the integration platform independently and deterministically constructs the host reference.

10. The system of claim 7, wherein:
the host reference is used for a Software as a Service (SaaS) connection based on a fixed portion plus a unique portion created using the public key as an identifier.

11. The system of claim 7, wherein:
a management system of the device management framework is leveraged to broker a SaaS service deployment between the integration platform and the userless client device.

12. The system of claim 7, wherein the instructions are further configured for:
securely attaching a managed userless device to a tenant based SaaS offering by leveraging a connection plug-in and temporary/ephemeral URL architecture with a one-time use construct.

13. A non-transitory, computer-readable storage medium embodying computer program code, the computer program code comprising computer instructions executed by a processor configured for:
sending the userless client device a connection plug-in from a device management framework, the connection plug-in describing use of a partial universal resource locator (URL) to be part of generation of a full URL based on the partial URL and a keypair;
generating the keypair at the userless client device by executing the connection plug- in;
providing the keypair to the device management framework, the keypair comprising a public key and a private key;
generating a request to provide a client attachment to an integration platform, the request providing the public key to the integration platform;
providing a host reference to the userless client device from the integration platform; and,
establishing a relationship between the userless client device and the integration platform via the host reference; and wherein
the userless client device comprises a headless device, the headless device comprising an Internet of Things (IoT) gateway, the IoT type gateway having a trust relationship with the device management framework, the device management framework comprising a cloud client manager, the headless device being an autonomous device having no associated input/output (I/O) device, the headless device not being attached to a domain and not being assigned a user identity.

14. The non-transitory, computer-readable storage medium of claim 13, wherein:
the host reference comprises a universal resource locator (URL).

15. The non-transitory, computer-readable storage medium of claim 13, wherein:
the integration platform independently and deterministically constructs the host reference.

16. The non-transitory, computer-readable storage medium of claim 13, wherein:
the host reference is used for a Software as a Service (SaaS) connection based on a fixed portion plus a unique portion created using the public key as an identifier.

17. The non-transitory, computer-readable storage medium of claim 13, wherein:
a management system of the device management framework is leveraged to broker a SaaS service deployment between the integration platform and the userless client device.

18. The non-transitory, computer-readable storage medium of claim 13, wherein the computer executable instructions are further configured for:

securely attaching a managed userless device to a tenant based SaaS offering by leveraging a connection plug-in and temporary/ephemeral URL architecture with a one-time use construct.

* * * * *